N. THOMPSON, Jr.
MODE OF INDICATING THE HEIGHT OF WATER IN STEAM BOILERS.
No. 9,905. Patented Aug. 2, 1853.
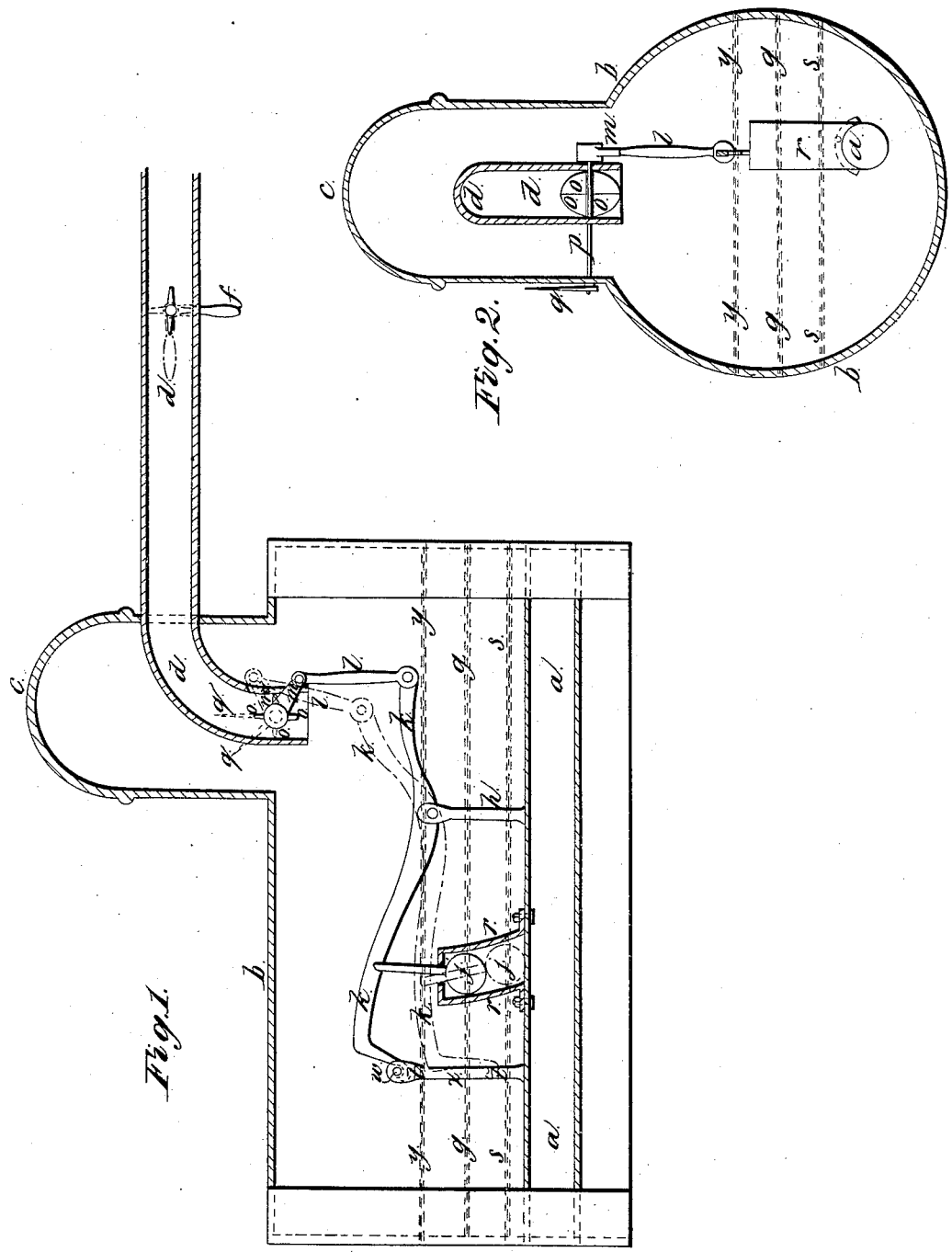

UNITED STATES PATENT OFFICE.

NATHAN THOMPSON, JR., OF WILLIAMSBURGH, NEW YORK.

MODE OF INDICATING THE HEIGHT OF WATER IN STEAM-BOILERS.

Specification of Letters Patent No. 9,905, dated August 2, 1853.

*To all whom it may concern:*

Be it known that I, NATHAN THOMPSON, Jr., of the town of Williamsburgh, county of Kings, and State of New York, have invented certain new and useful Improvements in the Method of Indicating a Deficiency of Water in Steam-Boilers, and that the following specification, taken in connection with the drawings, is a full and clear description thereof.

The evils resulting from a depression of the water below the level of the flues, or arches of steam boilers are so well known that it would be superfluous to describe them all; suffice it to say however that it is my firm belief, and in this belief many men both practical and scientific concur that the explosion of no boiler sufficiently full of water is attended with much loss of human life or property. The explosions which are so awfully destructive are all or nearly all consequent upon a deficiency of water. The subject being of so great importance has occupied much attention and has incited much ingenuity which has been displayed in the invention of apparatus which has for its object either the obsolute prevention of a deficiency of water, or the indication in some striking manner that such event is about taking place. Of the former class are the multitude of auxiliary engines, pumps, or feed apparatus, put in action by floats, &c., and of the latter are the whole family of gages proper, and also of those instruments which through the agency of whistles, horns, or bells, give some noisy alarm, warning both attendants on the engine and the bystanders that the water is getting too low. My invention belongs to the latter class, in which ingenuity has even hitherto been severely tasked to discover alarms sufficiently striking, or which shall never fail to arouse the vigilance of those interested; and the object of my invention is to give a warning of such a character as cannot be willfully disregarded. Neither can it be unheeded by the most careless or unwary.

The nature of my invention therefore consists in a method of stopping the main engine and bringing it absolutely to a state of rest when the water-level becomes dangerously low, the same apparatus also serving the purpose of indicating from time to time, that the water is nearly and more nearly reaching such a state.

The apparatus used for carrying out this invention may be variously diversified, as floats, throttle-valves, and connecting-links of various kinds are well known to those conversant with steam-engines. My drawings, however, represent an arrangement which is simple and well suited for the purpose; and the apparatus consists, mainly, of a float, a throttle-valve, and an appropriate connection between the throttle and the floats, the whole so arranged and connected that the falling of the water gradually contracts and finally closes entirely the area of the steam-pipe, at first slowing down, and at last completely stopping the main engine. In addition to these main characteristics are the additional ones that the whole apparatus is completely inclosed within the boiler, so that it cannot be tampered with, and that the float is inclosed in a chamber so constructed that the former will not be affected by the foaming or the oscillations of the water within the boiler.

In the drawings Figure 1, represents a longitudinal and Fig. 2 a transverse section through a boiler fitted with my apparatus.

The same letters refer to the same parts in both figures.

$a$, $a$, represents the flue or uppermost heating surface within the boiler of which $b$ $b$ is the shell. On top or alongside of this flue is fixed a vessel $r$ $r$, perforated near its bottom with a number of minute holes, and covered with a top in which are one or more perforations. This vessel has arranged within it a float $j$ which by means of a rod is connected to one end of a lever $k$, pivoted upon a standard $h$. To the other end of this lever is attached a link or strap $l$, which takes upon the arm $m$, of a shaft $p$, upon which and within the steam pipe is mounted the throttle valve $o$. The steam pipe $d$ enters the boiler in that part of it commonly called the dome $c$, and is provided with the usual hand throttle valve $f$.

Upon the shaft, $p$, and outside the boiler may be attached an index, $g$, which will indicate the height of the water in the boiler. This index if used must be so slightly connected that it will be impossible by means thereof to hold the valve open against the weight of the float when the latter is left by the water, and I generally dispense with it altogether, preferring that the engineer should be apprised of the height of the water by means of the ordinary gage cocks or their usual substitutes. The throttle valve is of the disk variety and the red lines in Fig. 1 represent the float connections and valve in the position of entirely closing the steam pipe when the water has reached the lowest point to which it can be permitted to fall with safety while the black lines show the same apparatus in the position it occupies when the water is well up and the throttle valve wide open. A hook, t, upon one end of the lever takes under the pin w in the standard, y, and prevents the further rising of the ball no matter how high the water may be permitted to rise, it being obvious that if no such stops were interposed the ball might rise so high as to shut the throttle when an unusual height of water was attained.

The action of the apparatus is obvious, as the water falls below the level, g, the float, j, falls with it, as it descends the lever k changes from the black to the red position gradually closing the valve, and slowing down the engine; until the water reaches the line, S, when the ball completely shuts the throttle, stops off the steam, and stops the main engine. As the steam has then no escape it rises in tension and ultimately raises the safety valve and escapes through it. The vessel r prevents to a great extent all variation of the float which might be caused by the foaming of the boiler, or by oscillations of the boiler when on ship board, as experience has proved that the water level within the vessel will always be about the mean level of the water in the boiler, the small holes preventing any sudden entrance or discharge of water, and consequently any sudden changes of the level of the water within the vessel.

Now it is obvious that this apparatus may be variously modified without changing the nature of my invention so long as a float within the boiler acts on the throttle-valve of the main engine in the manner described. For instance, the float might be connected directly either to the link l, or to the arm n or a rack might be attached to the float, which should engage with a cog-wheel upon the valve shaft, or a puppet throttle-valve, or a cock, or any known kind of valve might be employed in place of the disk-valve represented in my drawing. Many other such modifications have suggested themselves to myself and would suggest themselves to any well-informed mechanic.

The chamber r, might be dispensed with in stationary boilers and the connections between the float and the valve might be outside instead of inside the shell, but all such changes would merely alter the arrangement, or construction of the apparatus without changing the invention.

I would further state that I have found it expedient in practice to arrange and proportion the standard, x, and its pin w, that the ball or float shall never be permitted to rise up to the ordinary working water level. Fluctuations of level within the limits of safety will therefore not influence either the float or the throttle and the working of the engine will not be affected until it is necessary to inquire into the cause of the deficiency of water.

The advantages arising from my method as contrasted with others are both numerous and important, more so in fact than the limits of a specification would warrant me in pointing out. The first and most important one however is that the alarm when given is of such a character that it must be noticed. The stoppage of a steamer, or of the machinery in any factory or shop, or even its slowing down are facts always noticed by the captain, crew, and passengers in the one case, and by the foreman and operatives in the other. A loss of time and consequently of money accrues in either case and self interest will always prompt immediate investigation and punishment of the offending party. The absolute impossibility of starting the engine until the boilers are pumped up, for the throttle must remain shut until the water level is raised, will add to this loss of time, and will act as an additional incentive to investigation and punishment, and it is believed that no engineer who knows his boiler is provided with this apparatus will ever dare to carry his water low. It will secondly on our western waters prevent the practice of racing, with the water but little over the tops of the flues as the very measure which now accelerates the speed of the boat, will then diminish it, for as the water falls the valve shuts, the steam withdraws, the engine is slowed, and the speed of the boat is diminished until her course is finally arrested, and that through the carrying out of the very dangerous, and reprehensible practice which now so materially increases the speed of a hard pushed craft. When water falls below the flues the best practice now known is to haul or dampen down the fires, to shut off the feed, to get rid of the steam slowly, and to wait until the boilers cool before pumping them up. The feed pumps are in all cases nowadays driven by the main engine; and the next advantage in importance therefore consists in the fact that my apparatus of itself performs two of these duties viz, it causes the safety valve to lift, and it stops the main engine, and consequently shuts off the feed.

I might enumerate other characteristics and other advantages of my invention but believe those already set forth sufficient, clearly to distinguish it from others, and ample to prove its utility.

Having thus fully described my invention and one method of carrying it out, I wish it to be distinctly understood that I do not claim either floats, or valves, or chambers, or levers, as of my invention knowing that they are well known and common property, neither do I claim the combination of a float within a boiler with indicators or alarms in the general; but What I do claim as of my own invention and desire to secure by Letters Patent of the United States is—

1. The method substantially as herein described of slowing, and stopping the main engine by means of a float or its equivalent which is governed in its position by the height of the water in the boiler, whereby I am enabled to furnish a reliable and not to be disregarded intimation of the level of the water in the boiler.

2. A hook and pin, or their equivalents in combination with a boiler float, whereby said float is prevented from acting during ordinary fluctuations of the water level substantially in the manner and for the purposes herein specified.

NATHAN THOMPSON, Jr.

Witnesses:
GILBERT J. NIXON,
FREDERIC BULL.